United States Patent

Stevens et al.

[15] 3,670,170

[45] June 13, 1972

[54] NON-VISIBLE ELECTROMAGNETIC RADIATION MEASURING DEVICE

[72] Inventors: John M. Stevens, Upper Darby; Richard R. Maxwell, Media, both of Pa.

[73] Assignee: John M. Stevens, West Chester, Pa.

[22] Filed: March 15, 1971

[21] Appl. No.: 124,667

[52] U.S. Cl. ............................250/229, 250/239, 95/10 C, 250/83.3 UV
[51] Int. Cl. .......................................................G01d 5/34
[58] Field of Search.................250/229, 231, 239, 83.3 UV; 95/10 C

[56] References Cited

UNITED STATES PATENTS

| | | | |
|---|---|---|---|
| 2,621,557 | 12/1952 | Kavanagh | 250/239 X |
| 3,235,741 | 2/1966 | Plaisance | 250/229 |
| 3,498,194 | 3/1970 | Bellows | 95/10 C |
| 3,500,730 | 3/1970 | Matsubara et al. | 95/10 C |

Primary Examiner—Walter Stolwein
Attorney—Louis Necho

[57] ABSTRACT

A non-visible electromagnetic radiation measuring device which incorporates a photoconductive cell responsive to electromagnetic waves of wavelength in the range of 3700 angstroms, a microammeter connected in series with the photoconductive cell and a variable resistor connected in the circuit to vary the current flow through the photoconductive cell. A switch has its arm connected to an apertured shutter and is responsive to an external push button to both close the photoconductive cell circuit and to simultaneously register the shutter aperture with an opening in the device housing which communicates with the photoconductive cell to thereby admit electromagnetic waves to the cell for measuring purposes. Release of the push button automatically releases the switch arm to both open the photoconductive cell circuit and to move the shutter aperture out of registry with the housing opening.

7 Claims, 5 Drawing Figures

PATENTED JUN 13 1972 3,670,170
FIG. 1
FIG. 2
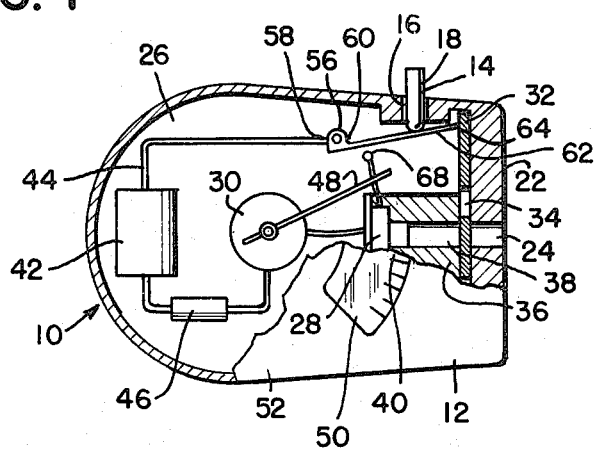
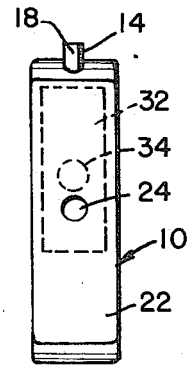
FIG. 3
FIG. 4
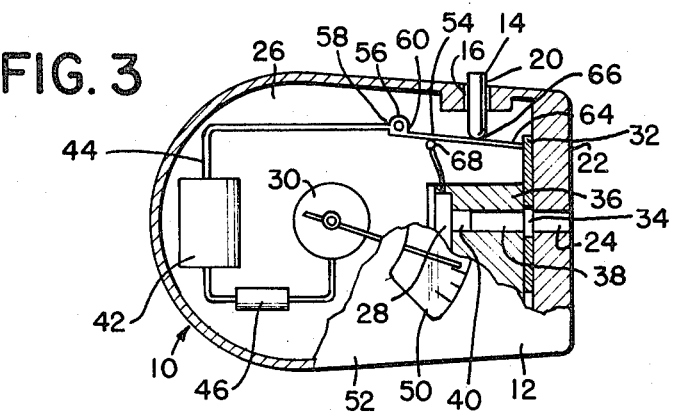
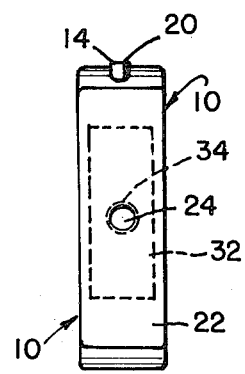
FIG. 5
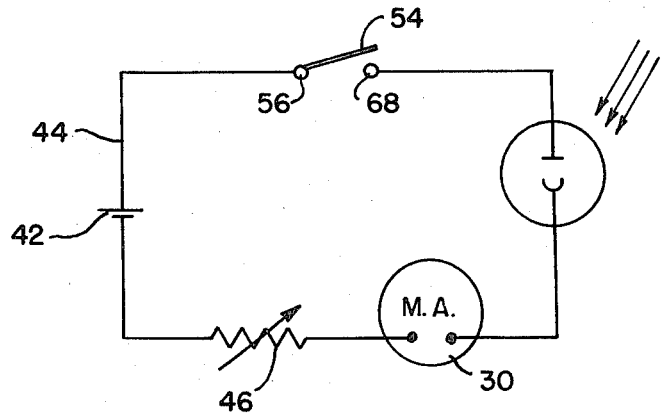
INVENTORS:
JOHN M. STEVENS
RICHARD R. MAXWELL
BY *Louis Necho*
ATTORNEY.

NON-VISIBLE ELECTROMAGNETIC RADIATION MEASURING DEVICE

BACKGROUND OF THE INVENTION

This invention relates generally to light measuring devices and more particularly is directed to a device capable of measuring non-visible, electromagnetic radiation.

It has become increasingly important to find an inexpensive, reliable method for determining the approximate magnitude of incident ultraviolet light rays falling upon a person. Since this type of radiation is prominent in influencing the rate at which melanin development occurs, it is of utmost importance that individuals who are particularly sensitive to such radiation be provided with a reliable, inexpensive, portable instrument to prevent overexposure to ultra-violet rays with the accompanying detrimental physiological defects.

Since ultra violet radiation exhibits different absorption during atmospheric penetration, it is highly likely that usual prior art light meters would yield readings which were based primarily upon the intensity of the visible light spectrum and which would not be truly indicative of the ultra-violet level. Prior workers in the art have universally employed conventional light meters for the purpose of measuring all light rays and these meters are inherently subject to error due to the intensity of the visible light rays. Thus, on overcast days or in other instances of low visible light level, the presently available light meters have proved entirely unsatisfactory for monitoring ultra-violet light. Under such overcast conditions, an individual who was particularly sensitive to ultra-violet light could unwittingly be exposed to histological damage should he rely entirely on the readings obtained on conventional meter equipment.

SUMMARY OF THE INVENTION

This invention relates generally to instruments capable of measuring non-visible electromagnetic radiation, and more particularly, is directed to a light measuring device responsive to electromagnetic waves of wavelength in the 3,700 angstrom range which are commonly referred to as the ultra-violet spectrum.

The present invention incorporates a relatively simple, compact, portable housing which encases a photoconductive cell responsive to wavelengths in the range of 3,700 angstrums and an operating electrical circuit connected in series with the photoconductive cell. The circuit includes a variable resistor, a source of electromotive force such as a small battery and an electromechanical transducer (microammeter), including a scale and a needle movable over the scale to indicate accurate ultra-violet light readings. The housing includes a window opening to the photoconductive cell to allow outside light sources to be scanned by the photoconductive cell. A pivotal metallic switch arm connects to an apertured shutter and is responsive to a push-button which is operable through the housing. The pushbutton serves to pivot the switch arm to both close the electrical circuit and to simultaneously slide the shutter aperture into registry with the housing window. Exterior light rays are thereby momentarily admitted into the photoconductive cell simultaneously with the energization of the electrical circuit whereby a meter reading can be obtained. Releasing the push-button both opens the electrical circuit and causes the shutter aperture to slide out of registry with the housing window.

It is an object of the present invention to provide an improved non-visible electromagnetic radiation light measuring device of the type set forth.

It is another object of the present invention to provide a novel, non-visible electromagnetic radiation light measuring device incorporating a photoconductive cell and supporting circuitry operative in the 3,700 angstrom wavelength range.

It is another object of the present invention to provide a novel, non-visible electromagnetic radiation light measuring device incorporating means to simultaneously activate an electrical circuit and to operate means to admit light into the device for measuring purposes.

It is another object of the present invention to provide a novel, non-visible electromagnetic radiation light measuring device that includes a small, portable housing, a photoconductive cell within the housing, an electrical circuit operating the photoconductive cell and a switch means capable of simultaneously activating the electrical circuit and functioning an apertured shutter to admit light into the interior of the housing only when the electrical circuit is activated.

It is another object of this invention to provide a novel non-visible electromagnetic radiation light measuring device that incorporates means for shielding the photoconductive cell from all radiation, both visible and ultra-violet, except at the actual instance of measurement.

It is another object of the invention to provide a novel, non-visible electromagnetic radiation light measuring device that is compact in nature, simple in operation, and trouble free when in use.

Other objects and a fuller understanding of the invention will be had by referring to the following description and claims of a preferred embodiment thereof, taken in conjunction with the accompanying drawings wherein like reference characters refer to similar parts throughout the several vies and in which:

BRIEF DESCRIPTION OF THE DRAWINGS

FIG. 1 is a top plan view of the invention, partially broken away to expose details of interior construction and showing the switch arm in the circuit open position.

FIG. 2 is an end elevational view taken along lines 2—2 of FIG. 1, looking into the direction of the arrows.

FIG. 3 is a top plan view similar to FIG. 1, partially broken away to expose details of interior construction and showing the switch arm in the circuit closing position.

FIG. 4 is an end elevational view taken along line 4—4 of FIG. 3, looking in the direction of the arrows.

FIG. 5 is a schematic wiring diagram of the invention.

DESCRIPTION OF THE PREFERRED EMBODIMENT OF THE INVENTION

Although specific terms are used in the following description for the sake of clarity, these terms are intended to refer only to the particular structure of our invention selected for illustration in the drawings, and are not intended to define or limit the scope of the invention.

Referring now to the drawings, we show in FIG. 1, a non-visible electromagnetic radiation measuring device generally designated 10 which includes a housing 12 for enclosing the operating parts. An opening 16 is provided in one side of the housing 12 and reciprocally receives a push-button 14 therein for switch activation purposes. If desired, the push-button 14 may be spring biased in well-known manner to urge the push-button 14 outwardly to its initial position 18 as illustrated in FIG. 1. When it is desired to activate the device, the push-button 14 is pushed inwardly to its circuit closing position 20 as illustrated in FIG. 3 for circuit activating purposes as hereinafter more fully set forth.

The front end wall 22 of the housing 12 is drilled or otherwise treated to provide a light entrance opening 24 to admit light waves into the interior of the housing. While all light rays, both visible and ultra-violet enter the device through the opening 24, it is the purpose and intent of this invention to provide a photoconductive cell 28 and electrical circuitry designed to monitor only the non-visible electromagnetic radiation waves.

Immediately interiorly of the front end wall 22, a shutter 32 positions for vertical reciprocal motion within the housing 12 adjacent the front end wall 22. The shutter 32 is preferably fabricated of the same material as the housing or of other light-tight materials suitable for the purpose and is held in reciprocal engagement through suitable clips or other guides (not shown) in well-known manner. The shutter 32 is drilled to provide an opening 34 which aligns and registers with the light entrance opening 24 in the housing 12 when the push-button 14 is depressed to its circuit closing position 20. See FIG. 3. When the push-button 14 is biased to its initial position 18 as in FIG. 1, the shutter 32 and consequently the shutter opening 34 pulls upwardly out of the registry with the housing light entrance opening 24. The shutter 32 then acts as a baffle and positively prevents the entrance of light into the interior 26 of the housing 12. As seen in FIGS. 1 and 3, photoconductive cell 28 positions upon a mounting block 36 in spaced relation from the light entrance opening 24. The mounting block 36 may be integrally formed in the housing 12 and includes a light passageway 38 which registers with the housing light entrance opening 24 for light admitting purposes. The photoconductive cell 28 rearwardly secures to the mounting block 36 in any well-known, secure manner, such as by small screws (not shown) with its lens 40 aligned within the passageway 38. Thus, when the shutter opening 34 registers with the light entrance opening 24 of the housing 12, exterior light rays will traverse the passageway 38 and enter a lens 40 of the photoconductive cell 28.

A source of electromotive force which preferably is a small, replaceable battery 42 supplies electrical current to an electrical circuit 44 which includes a variable resistor 46 wired in series therewith. The variable resistor 46 provides means for ready adjustment of the microammeter 30 response to the level of incident ultraviolet rays in well-known manner. As best seen in FIG. 5, both the microammeter 30 and the photoconductive cell 28 connect in series in the electrical circuit 44 so that all current flowing in the circuit flows directly through the microammeter in the usual manner for non-visible electromagnetic radiation wave monitoring purposes. A conventional needle 48 responds to the flow of current through the microammeter 30 and swings over a scale 50 in conventional manner to visually indicate the relative quantities of ultra-violet light rays incident in the general vicinity. The scale 50 is formed in the top 52 of the housing 12 in well-known manner to permit visual observation of the needle, reading upon the scale without permitting entrance of light into the interior 26 of the housing 12. As best seen in FIGS. 1 and 3, a switch arm 54 has its pivot end 56 connected to the circuit terminal 58 in a pivotal connection 60, preferably is spring biased to urge the switch arm 54 to its circuit open position 62 as illustrated in FIG. 1. The second end 64 of the switch arm 54 connects directly to the shutter 32 in a manner to vertically reciprocate the shutter in response to pivotal movement of the switch arm. When the switch arm 54 is biased to its circuit open position 62, it pulls the shutter 32 to its upper limit of travel within the housing 12 as illustrated in FIG. 1 to move the shutter opening 34 out of registry with the passageway 38 and the light entrance opening 24 to thereby prevent light from entering the interior 26 of the housing 12. In this position, the push-button 14 is biased to its initial position 18 as in FIG. 1.

Upon depressing the push-button 14 to its circuit closing position 20 as in FIG. 3, the inward end 66 of the push-button 14 presses against the switch arm 54 intermediate its ends 56, 64 and pivots the switch area in a clockwise direction about its pivotal connection 60. Under impetus of the forces imposed by the push-button 14, the arm 54 rotates until it stops against the second circuit terminal 68 to thereby complete the electrical circuit 44 to allow current from the battery 42 to flow through the circuit. The switch arm affixed shutter 32 is urged downwardly within the housing 12 upon pivoting of the switch arm 54. The shutter opening 34 is designed to align with the passageway 38 and the light entrance opening 24 when the switch arm 54 is in contact with the circuit terminal 68 to momentarily permit the entrance of light to the lens 40 of the photoconductive cell 28. Release of the push-button 14 releases the switch arm 54 and causes all of the parts to assume the initial position as in FIG. 1. It will be noted that the switch arm 54 swings clear of the second circuit terminal 68 when released by the push-button 14 under impetus of the spring biased pivotal connection 60 to thereby open the circuit as in FIG. 5. Movement of the switch arm 54 away from the second circuit terminal 60 opens the circuit between the terminals 56, 68 and prevents the blow of current. The photoconductive cell 28, the variable resistor 46 and the microammeter 30 all connect in series in the circuit. The movement of the switch arm 54 away from the circuit terminal 68 accordingly will completely interrupt current flow so that there will be no reading whatsoever on the scale 50.

We claim:

1. In a non-visible, electromagnetic radiation measuring device, the combination of
   A. a housing,
      1. said housing being provided with a light entrance opening and a push-button opening;
   B. a photoconductive cell mounted within the housing and having a portion thereof in registry with the light entrance opening;
   C. an electrical circuit contained within the housing and connected with the photoconductive cell,
      1. said electrical circuit terminating in a first circuit terminal and a second circuit terminal;
   D. a switch arm positioned within the housing and having a pivot end and a second end,
      1. said switch arm being pivotal from a circuit open position to a circuit closed position,
      2. said pivot end pivotally connecting to the first circuit terminal in an electrically conductive connection,
      3. said second end being normally biased away from the second circuit terminal to the circuit open position;
   E. a push-button positioned within the push-button opening and having reciprocal motion with respect to the housing,
      1. said push-button having an initial position and a circuit closing position,
         a. said initial position corresponding to the said circuit open position of the switch arm,
         b. said push-button pivoting the switch arm to its circuit closed position when the push-button is moved to its said circuit closing position; and
   F. shutter means reciprocal within the housing and having an opening therethrough,
      1. said shutter means reciprocating in a path intermediate the said light entrance opening and the said photoconductive cell,
      2. said shutter opening means for aligning with the light entrance opening when the switch arm is pivoted to its circuit closing position and the shutter opening moving out of alignment with the light entrance opening when the switch arm is biased to its circuit open position.

2. The invention of claim 1 wherein the second end of the switch arm connects to the shutter to move the shutter in response to movement of the switch arm.

3. The invention of claim 1 wherein the said photoconductive cell includes a lens and the light entrance opening communicates with a passageway, the said lens being positioned within the passageway in alignment with the light entrance opening.

4. The invention of claim 1 wherein the photoconductive cell is responsive to electromagnetic waves of wavelength in the range of 3,700 angstroms.

5. The invention of claim 1 wherein the said pivotal electrically conductive connection includes a coil spring, the said coil spring continuously biasing the switch arm to the said circuit open position.

6. The invention of claim 2 wherein the switch arm contacts the second circuit terminal intermediate its ends when it is urged to the circuit closed position by the push-button.

7. The invention of claim 6 wherein the electrical circuit includes a battery, a variable resistor and a microammeter.

* * * * *